(12) United States Patent
Mönk et al.

(10) Patent No.: US 8,545,174 B2
(45) Date of Patent: Oct. 1, 2013

(54) NOSE DOME FOR A TURBOMACHINE ROTOR

(75) Inventors: Thomas Mönk, Gladbeck (DE); Axel Spanel, Duisburg (DE); Wolfgang Zacharias, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 947 days.

(21) Appl. No.: 12/664,729

(22) PCT Filed: Jun. 5, 2008

(86) PCT No.: PCT/EP2008/056955
§ 371 (c)(1),
(2), (4) Date: Dec. 15, 2009

(87) PCT Pub. No.: WO2009/000618
PCT Pub. Date: Dec. 31, 2008

(65) Prior Publication Data
US 2010/0183432 A1    Jul. 22, 2010

(30) Foreign Application Priority Data
Jun. 27, 2007  (EP) .................................... 07012621

(51) Int. Cl.
*F04D 29/08*   (2006.01)
(52) U.S. Cl.
USPC ...................................................... 415/171.1

(58) Field of Classification Search
USPC ............ 415/230, 171.1; 416/93 R, 94, 93 A, 416/174, 244 R, 245 R, 245 A, 244 A
See application file for complete search history.

(56) References Cited

U.S. PATENT DOCUMENTS

| | | | | |
|---|---|---|---|---|
| 2,784,551 | A | * | 3/1957 | Karlby et al. .................... 60/763 |
| 3,756,741 | A | * | 9/1973 | Woell, Jr. .................... 415/173.4 |
| 4,325,673 | A |   | 4/1982 | Hall, Jr. |
| 4,772,135 | A | * | 9/1988 | Griguscheit ..................... 384/99 |
| 4,997,340 | A | * | 3/1991 | Zinsmeyer et al. ........... 415/105 |
| 6,158,977 | A |   | 12/2000 | Ochiai |
| 6,327,857 | B1 |  | 12/2001 | Fredriksson |

* cited by examiner

*Primary Examiner* — Nathaniel Wiehe
*Assistant Examiner* — Ryan Ellis

(57) ABSTRACT

A nose dome for a turbomachine rotor is provided. The turbomachine rotor has an impeller which is arranged in an overhung fashion with respect to a bearing point of the turbomachine rotor. The nose dome can be connected axially to the impeller in order to guide an axial inflow and/or outflow of the impeller, and includes a coupling device. The impeller and the nose dome can be mechanically coupled radially with the coupling device, such that the vibration behavior of the turbomachine rotor may be influenced. The turbomachine with the turbomachine rotor including the nose dome is also provided. The impeller and nose dome are coupled radially using the coupling device, such that the vibration of the turbomachine rotor is damped.

19 Claims, 5 Drawing Sheets

NOSE DOME FOR A TURBOMACHINE ROTOR

CROSS REFERENCE TO RELATED APPLICATIONS

This application is the US National Stage of International Application No. PCT/EP2008/056955, filed Jun. 5, 2008 and claims the benefit thereof. The International Application claims the benefits of European Patent Office application No. 07012621.4 EP filed Jun. 27, 2007, both of the applications are incorporated by reference herein in their entirety.

FIELD OF INVENTION

The invention refers to a turbomachine and a nose dome for a turbomachine rotor which has an impeller which is arranged in an overhung manner in relation to a bearing point of the turbomachine rotor, wherein for the guiding of an axial inflow and/or outflow of the impeller the nose dome can be axially connected to this and has a coupling device by which the impeller and the nose dome can be radially mechanically coupled so that the vibrational behavior of the turbomachine rotor can be influenced.

BACKGROUND OF INVENTION

A turbomachine is for example a conventional turbocompressor 101, as is shown in FIGS. 8 and 9. The turbocompressor 101 has a casing 102 and a turbocompressor rotor 103 which is enclosed by the casing 102. The turbocompressor rotor 103 has a shaft 104 which is supported on the casing 102 on a bearing point 105. In addition, the turbocompressor rotor 103 has an impeller 106 which is arranged in an overhung manner in relation to the bearing point 105. The impeller 106 is a centrifugal compressor impeller, the inflow of which runs in the axial direction of the shaft 104 and the outflow of which runs in the radial direction of the shaft 104. The inflow is guided in an inlet passage 107 of the turbocompressor 101 which extends in the axial direction of the shaft 104 so that the inflow impinges upon the impeller 106 in the axial direction of the shaft 104. For manipulating the inflow, for example for imposing swirl upon the inflow, a multiplicity of variable guide vanes 108 are arranged in the inlet passage 107, wherein the variable guide vanes 108 are assembled to form a blade ring.

As is shown in FIG. 8, the hub region of the guide vanes 108 is provided with a nose dome 110 which is fastened on the impeller 106 and therefore rotates along with the impeller 106.

The nose dome 110 is aerodynamically formed and serves for minimizing as far as possible the disturbing influence of the hub region of the impeller 106 in the inflow.

As is shown in FIG. 9, alternatively to the rotating nose dome 110 a stationary nose dome 111 can be provided in the region of hub region of the impeller 106. The nose dome 111 is held in position by a strut 109 which is fastened in the inlet passage 107. The nose dome 111 is also aerodynamically formed so as not to disturb as far as possible the inflow to the impeller 106. Furthermore, the strut 109 is aerodynamically formed in order to minimize as far as possible the disturbing influence of the strut 109 upon the inflow. The strut 109 is arranged upstream of the variable guide vanes 108 and the stationary nose dome 111 is formed longer in the axial direction of the shaft 104 than the rotating nose dome 110. Between the impeller 106 and the stationary nose dome 111 a relative movement takes place during operation of the turbocompressor 101. The nose dome 111 is arranged at a distance from the impeller 106 so that the impeller 106 does not come into contact with the stationary nose dome 111 and therefore cannot rub upon it and damage it.

The rotor dynamics of the turbocompressor rotor 103, i.e. the dynamic vibrational behavior of the turbocompressor rotor 103 during operation of the turbocompressor 101, depends essentially upon the geometry and the constructional design of the turbocompressor rotor 103 and upon the dynamic characteristics which are inherent to the bearing point 105, especially the rigidity and the damping of the bearing point 105. The bearing point 105 is conventionally fanned by a tilting-pad slide bearing which has the corresponding rigidity and the corresponding damping in conformance with its design, construction and its operation. When running up the turbocompressor rotor 103 to its operating speed the turbocompressor rotor 103 as a rule passes at least one critical speed. In order to avoid damage of the turbocompressor rotor 103 when running up to the critical speed, the radial vibration amplitude of the turbocompressor rotor 103 has to lie constantly within constructionally specified limits. These limits can be maintained when the rotor dynamics of the turbocompressor rotor 103 are correspondingly established, especially by means of the geometry and the constructional design of the turbocompressor rotor 103 and of the rigidity and the damping of the bearing point 105.

High radial vibration amplitudes which are induced by the overhung support of the impeller 106 are frequently to be recorded on the impeller 106 when running up to the critical speed. As a result, the turbocompressor rotor 103 with its overhung-supported impeller 106 is frequently difficult to control from the rotor-dynamic point of view.

Moreover, it is known that especially in the case of high gas densities an interaction of the compressor rotor with the compressed gas can result in self-excited vibrations of the rotor which can lead to destruction of the machine. This phenomenon is countered by means of a rotor-dynamically favorable construction, wherein up to now only the speed and the mass distribution of the rotor and also the damping and the rigidity of the bearing are parameters to vary.

Turbomachines with nose domes are known from documents U.S. Pat. No. 4,772,135, U.S. Pat. No. 6,158,977 and U.S. Pat. No. 6,327,857.

SUMMARY OF INVENTION

It is the object of the invention to create a nose dome for a turbomachine rotor and a turbomachine with the turbomachine rotor which has the nose dome, wherein the turbomachine has a compensated rotor-dynamic behavior and therefore can be reliably operated.

For the solution according to the invention, a nose dome with the features of the claims and a turbomachine with the features of the claims are proposed.

Consequently, the effect is advantageously achieved of the rotor-dynamic behavior of the turbomachine rotor being able to be determined or influenced by means of the coupling device in addition to the design of the bearing point and the geometric design of the turbomachine rotor.

By the coupling device, the nose dome acts on the impeller which is supported in an overhung manner with regard to the bearing point. Owing to the overhung support of the impeller, there is a favorable lever arm for the coupling device, with regard to the bearing point, for influencing the rotor-dynamic behavior of the turbomachine rotor. Consequently, the rotor-dynamic behavior of the turbomachine rotor can be effectively and favorably influenced by the means of the nose dome.

In this way, the vibration of the turbomachine rotor during operation can be damped by means of the coupling device so that the maximum vibration amplitude during operation of the turbomachine rotor is low. During operation of the turbomachine with gases with a high density the vibration amplitude of the turbomachine rotor can be so great that operation of the turbomachine with these gases leads to damage of the turbomachine. On account of the damping characteristic of the coupling device, the vibration amplitude of the turbomachine rotor, however, is low so that the turbomachine according to the invention can also be operated with these gases with high density with high operating reliability. Consequently, by means of the provision of the nose dome according to the invention in the turbomachine according to the invention, the realization of new machine concepts is possible, especially in ranges of application with gases with high gas density, such as at a high pressure of compressed carbon dioxide.

The nose dome therefore constitutes an additional construction element by which the damping of the vibration system can be favorably influenced.

It is preferred that the impeller has a shaft bore, which is accessible from the outside, with a cylindrical inner wall, and the coupling device has a projection with a cylindrical outer wall, which projection can be inserted into the shaft bore, forming a cylindrical, annular gap between the outer wall of the projection and the inner wall of the shaft bore, and has a pressurizing device by which the annular gap can be pressurized with pressurizing gas for damping the vibration of the turbomachine rotor.

Consequently, with a flow of the pressurizing gas through the annular gap, an annular, cylindrical gas cushion is achieved between the projection of the nose dome and the impeller. The gas cushion has a damping characteristic by which the vibration of the turbomachine rotor can be damped. By means of the pressurizing device, the flow of the pressurizing gas can be predetermined so that the damping characteristic of the gas cushion is adjustable. The annular gap is provided between the impeller and the projection of the nose dome so that despite the damping coupling between the impeller and the nose dome the impeller is not in contact with the nose dome. This being the case, the impeller and the nose dome are mechanically coupled without contact so that mechanical wear in the region of the coupling device on the impeller and on the nose dome is prevented.

It is preferred that the pressurizing device has a passage system formed in the nose dome for feeding the pressurizing gas into the annular gap, wherein the pressurizing gas can flow into the annular gap through the outer wall of the projection.

In this way, the pressurizing gas is guided to the annular gap inside the nose dome so that an additional space outside the nose dome for the supply of the annular gap with the pressurizing gas does not need to be provided. As a result, the pressurizing device is constructed in a space-saving manner inside the nose dome.

Furthermore, it is preferred that the coupling device has at least one labyrinth seal with labyrinth points which are attached on the outer wall of the projection and/or on the inner wall of the impeller.

If the pressurizing gas flows through the labyrinth seal inside the annular gap, i.e. around the labyrinth points, then a multiplicity of vortices are formed at the labyrinth points which increase the flow resistance of the pressurizing gas in the annular gap. As a result, the damping action of the gas cushion, which is formed by the pressurizing gas inside the annular gap, is improved.

The coupling device preferably has a multiplicity of the labyrinth seals, between which the pressurizing gas can be fed in each case into the annular gap for pressurizing the labyrinth seals.

The labyrinth seals can be separately, individually designed so that inside the annular gap a pressurizing profile which is adapted to the rotor dynamics of the turbomachine rotor can be created. In this way, the individual labyrinth seals can be differently formed in the axial direction of the turbomachine rotor and in its radial direction so that the individual seals have different damping and rigidity characteristics.

Alternatively, it is preferred that the coupling device has a honeycomb seal with honeycombs which are attached on the outer wall of the projection and/or on the inner wall of the impeller.

In addition, it is preferred that the coupling device has a multiplicity of the honeycomb seals, between which the pressurizing gas can be fed in each case into the annular gap for pressurizing the honeycomb seal.

Therefore, the individual honeycomb seals can be formed differently so that the individual honeycomb seals have different damping and rigidity characteristics.

It is preferred that the nose dome is fastened in a stationary manner relative to the impeller.

Consequently, the supply of the annular gap with the pressurizing gas inside the nose dome is to be simply accomplished since a relative movement does not take place between the nose dome and an external source for the pressurizing gas which as a rule is also stationary.

During operation of the turbomachine, the impeller rotates and the nose dome is stationary. As a result, a shear flow, which has high damping, is formed in the annular gap.

The turbomachine is preferably a centrifugal compressor which preferably has an inlet passage for the impeller and at least one strut by which the nose dome is suspended in the inlet passage.

The strut is positioned in a stationary, stable manner relative to the impeller, as a result of which forces from the impeller via the coupling device can be transmitted onto the nose dome via the strut to the inlet passage. Consequently, the engagement of the projection of the nose dome in the impeller is reliable and dimensionally accurate so that the damping action of the coupling device is effective.

The strut is preferably aerodynamically formed.

Consequently, the strut in the inlet passage has a low aerodynamic resistance, as a result of which the flow in the inlet passage is not disturbed much by the strut. Therefore, the turbomachine has high efficiency.

Furthermore, it is preferred that the strut is formed as a guide vane.

Owing to the fact that the strut is fastened in the inlet passage, it is stationary. The strut is advantageously the guide vane so that by means of the strut the inlet flow in the direction towards the impeller can be correspondingly advantageously deflected. As a result, the inflow to the impeller can be advantageously aerodynamically manipulated.

It is preferred that the pressurizing device can be supplied with the pressurizing gas through the strut.

Consequently, the pressurizing gas is guided from outside the inlet passage through the strut into the interior of the nose dome. The passage system, through which the pressurizing gas is guided to the outer wall of the projection, is provided inside the nose dome, wherein from the outer wall of the projection the pressurizing gas flows into the annular gap.

The pressurizing gas is preferably a process gas of the turbomachine.

With discharging of the pressurizing gas from the annular gap, the pressurizing gas mixes with the process gas of the turbomachine. Since the pressurizing gas has the same composition as the process gas, contamination of the process gas by the pressurizing gas does not take place. Furthermore, the pressurizing gas can be advantageously tapped from the turbomachine and a separate source for the pressurizing gas need not be provided.

The turbomachine preferably has at least one variable guide vane which is arranged between the strut and the impeller.

By means of the guide vane, the inflow to the impeller can be advantageously positively manipulated so that the impeller has high efficiency.

BRIEF DESCRIPTION OF THE DRAWINGS

In the following text, preferred exemplary embodiments of a turbocompressor according to the invention are explained with reference to the attached schematic drawings. In the drawing.

DETAILED DESCRIPTION OF INVENTION

Figure 1:
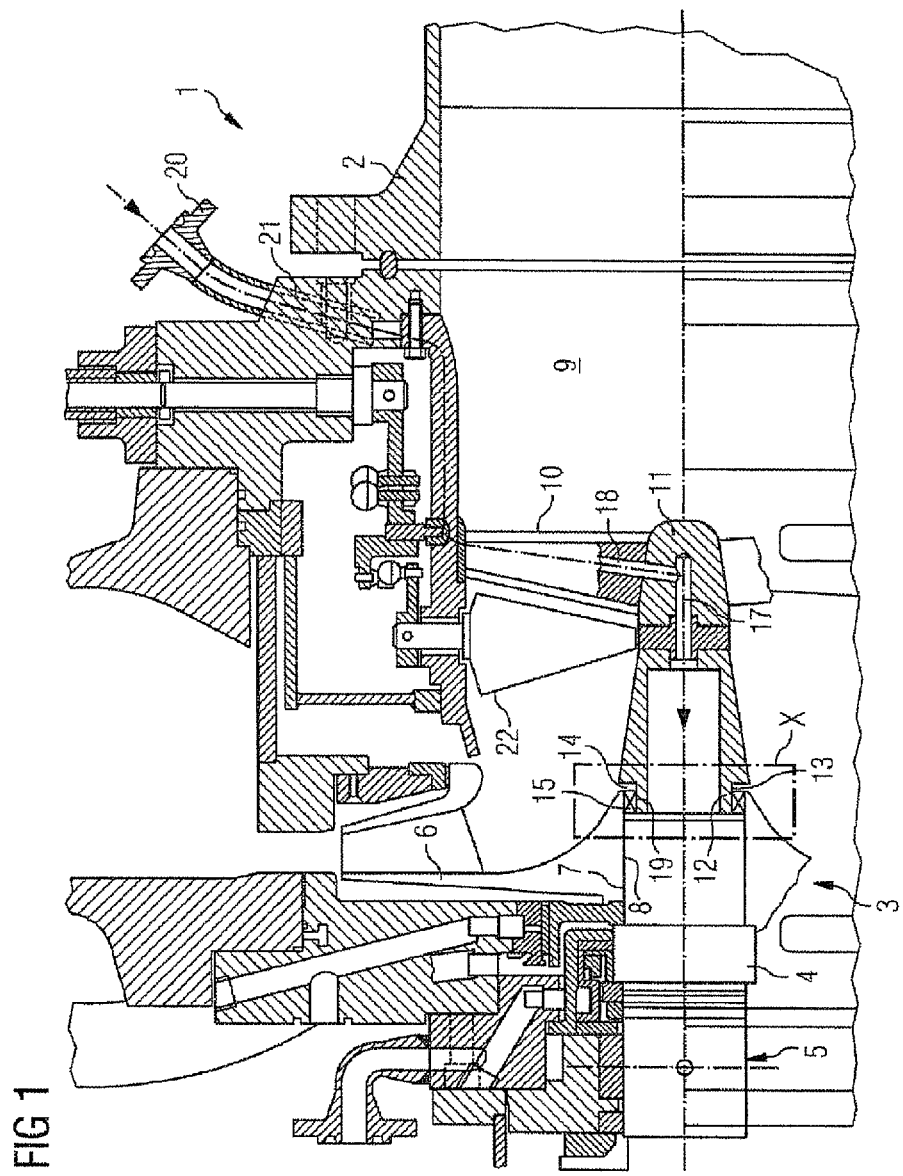
FIG. 1 shows a sectional view of the turbocompressor according to the invention.
Figure 2:
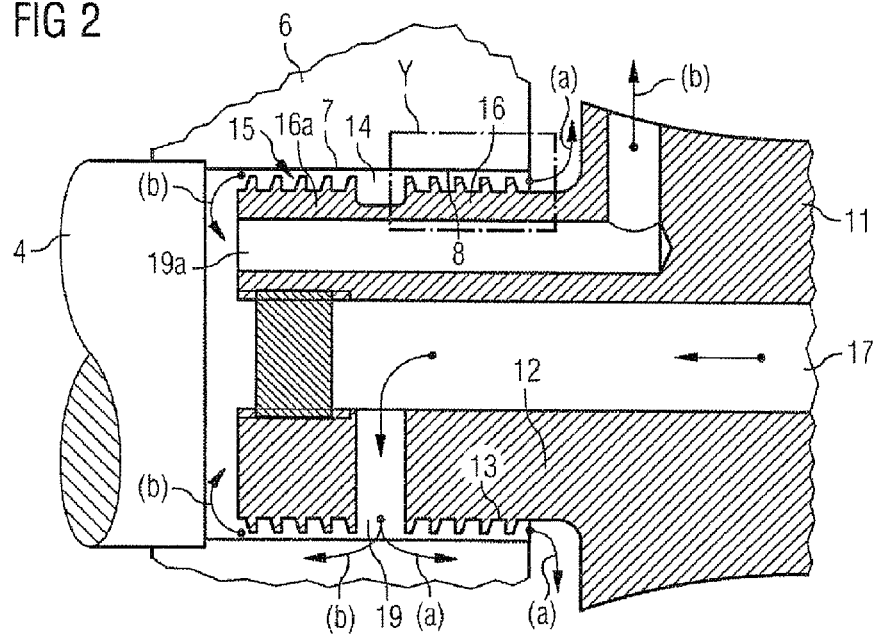
FIG. 2 shows detail X from FIG. 1.
Figure 3:
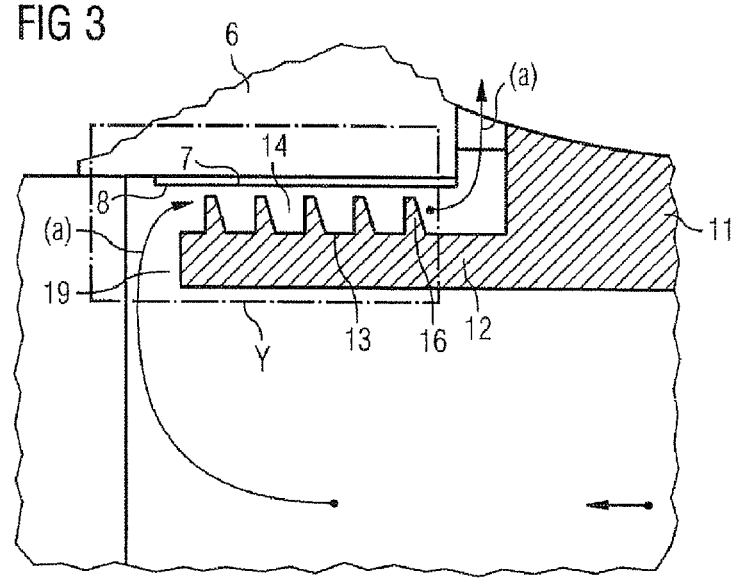
FIG. 3 shows detail Y from FIG. 2.

As is apparent from FIGS. 1 to 3, a turbocompressor 1 has a casing 2 and a turbocompressor rotor 3 which is enclosed by the casing 2. The turbocompressor rotor 3 has a shaft 4 which is supported on the casing 2 on a bearing point 5. In addition, the turbocompressor rotor 3 has an impeller 6 which is fastened on the shaft 4. The impeller 6 is arranged in an overhung supported manner with the regard to the bearing point 5. The impeller 6 has a shaft bore 7 in which the shaft 4 engages, wherein the shaft 4 does not fully penetrate the shaft bore 7. The shaft bore 7 is delimited by its inner wall 8 against which the shaft 4 tightly abuts.

The turbocompressor 1 has an inlet passage 9 through which the inflow to the impeller 6 is guided. The impeller 6 is a centrifugal compressor wheel with axial inflow characteristics, wherein the inlet passage 9 is arranged in the axial direction of the turbocompressor rotor 3.

A strut 10, on which is fastened a nose dome 11 which is centrally arranged in the inlet passage 9, is fastened in the inlet passage 9. The nose dome 11 has a projection 12 which from the inlet passage 9 engages in the shaft bore 7. The projection 12 has an outer wall 13 which is located in the shaft bore 7. Owing to the fact that the strut 10 holds the nose dome 11 centrally in the inlet passage 9, the outer wall 13 of the projection 12 is arranged concentrically to the inner wall 8 of the shaft bore 7. As a result, an annular gap 14 is formed between the inner wall 8 of the shaft bore 7 and the outer wall 13 of the projection 12.

In the annular gap 14 provision is made for a labyrinth seal 15 which has two labyrinths 16, 16a which lie axially one behind the other. The labyrinths 16, 16a are attached on the outer wall 13 of the projection 12 and are arranged at a distance from the inner wall 8 of the shaft bore 7.

Inside the nose dome 11, provision is made for a passage system 17 by which the annular gap 14 is provided with a pressurizing gas. The passage system has a passage system inlet 18 into which the pressurizing gas flows into the passage system 17, and has a passage system outlet 19 which is located on the outer wall 13 of the projection 12. The passage system outlet 19 is located inter alia between the two labyrinths 16 so that the pressurizing gas flows between the two labyrinths 16 into the annular gap 14.

The casing 2 has a feed connector 20 and a feed line 21 via which the pressurizing gas is guided to the strut 10. The strut 10 is hollow in construction and is connected by its cavity in a gas-directing manner to the passage system inlet 18 on the nose dome 11 so that from the feed connector 20 the pressurizing gas is guided via the feed line 21, the strut 10, the passage system inlet 18, the passage system 17 and the passage system outlet 19, between the labyrinths 16, 16a into the annular gap 14.

The pressurizing gas which flows through the passage system 17 splits into the flow (a) through the passage system outlet 19, via the labyrinth 16, into the space directly in front of the impeller 6, and into the flow (b) via the labyrinth 16a into the space between the projection 12 and the shaft 4, from where it is diverted through an end-face opening 19a also into the space directly in front of the impeller 6.

While the pressurizing gas which flows through the passage system outlets 19 along the labyrinths 16, 16a through the annular gap 14, it forms a gas cushion in the process.

During operation of the turbocompressor 1, the turbocompressor rotor 3 rotates. On account of the rotor-dynamic behavior of the turbocompressor rotor 3, this experiences a flexural vibration which leads to a dynamic radial movement of the impeller 6. In contrast to the turbocompressor rotor 3, the nose dome 11 is held stable and stationary by means of the strut 10 in the inlet passage 9. Consequently, a radial relative movement in particular is formed between the outer wall 13 of the projection 12 and the inner wall 18 of the shaft bore 7, as a result of which the annular gap 14 dynamically changes its shape. Consequently, the thickness of the gas cushion, which is formed in the annular gap 14, is altered, as a result of which the gas cushion, supported on the nose dome 11, acts upon the impeller with damping effect. As a result, the dynamic radial movement of the impeller 6 is limited so that the rotor-dynamic behavior of the turbocompressor rotor 3 is improved.

During operation of the turbocompressor 1, the turbocompressor rotor 3 rotates and with it the impeller 6. Since the nose dome 11 is arranged in a stationary manner, a shear flow is formed in the gas cushion in the annular gap 14. Consequently, the gas cushion has a high damping action.

The turbocompressor 1 furthermore has a variable diffuser 22 which is arranged between the impeller 6 and the strut 10, as seen in the axial direction of the turbocompressor rotor 3. By means of the variable diffuser 22 the inflow to the impeller 6 can be manipulated, especially a swirl being imposed, so that the impeller 6 has high thermodynamic efficiency.

Figure 4:
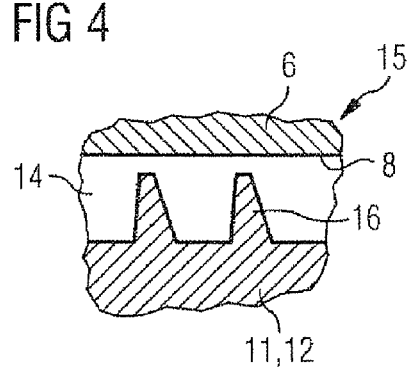
FIG. 4 shows a first embodiment of the coupling device.

In FIG. 4, a first embodiment of the coupling device is schematically shown, wherein the labyrinth 16 is mounted in a stationary manner, attached on the projection 12 of the nose dome 11.

The inner wall 8 of the shaft bore 7 of the impeller 6, which is moved relative to the labyrinth 16, is located in the annular gap 14, arranged opposite the labyrinth 16.

Figure 5:
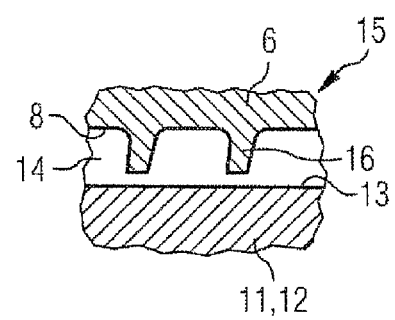
FIG. 5 shows a second embodiment of the coupling device.

In FIG. 5, a second embodiment of the coupling device is schematically shown, wherein the labyrinth 16 is attached on the inner wall 8 of the shaft bore 7 so that the labyrinth 16 rotates relative to the outer wall 13 of the projection 12.

Figure 6:
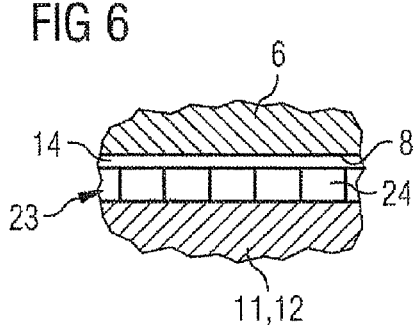
FIG. 6 shows a third embodiment of the coupling device.

In FIG. 6, a third exemplary embodiment of the coupling device is shown, which is comparable with the first embodiment according to FIG. 4, but with the difference that instead of the labyrinth 16 provision is made for a honeycomb seal 23 with a honeycomb 24.

Figure 7:
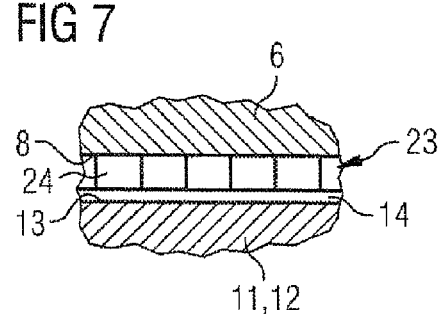
FIG. 7 shows a fourth embodiment of the coupling device.
Figure 8:
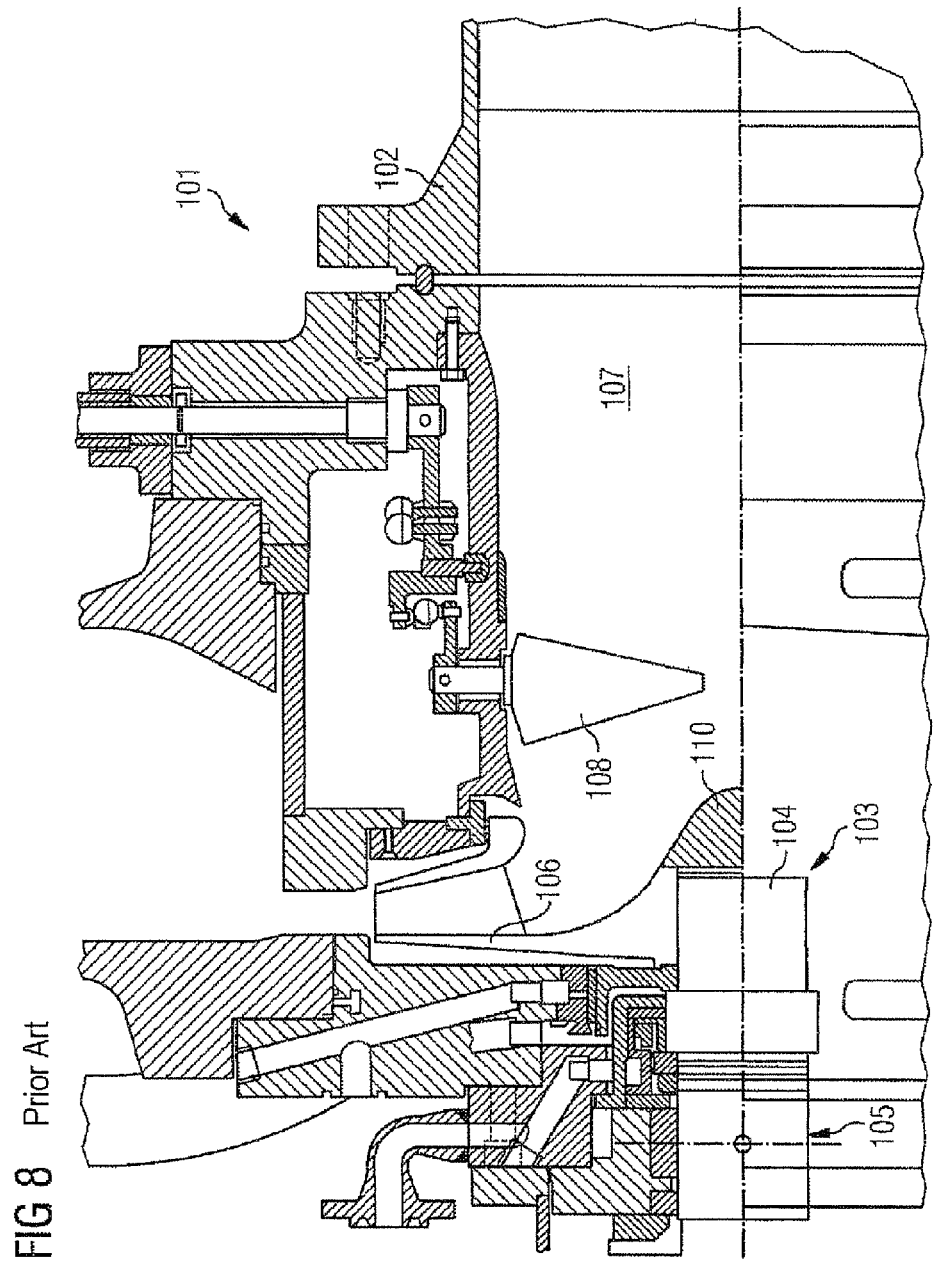
FIG. 8 shows a first example of a conventional turbocompressor.
Figure 9:
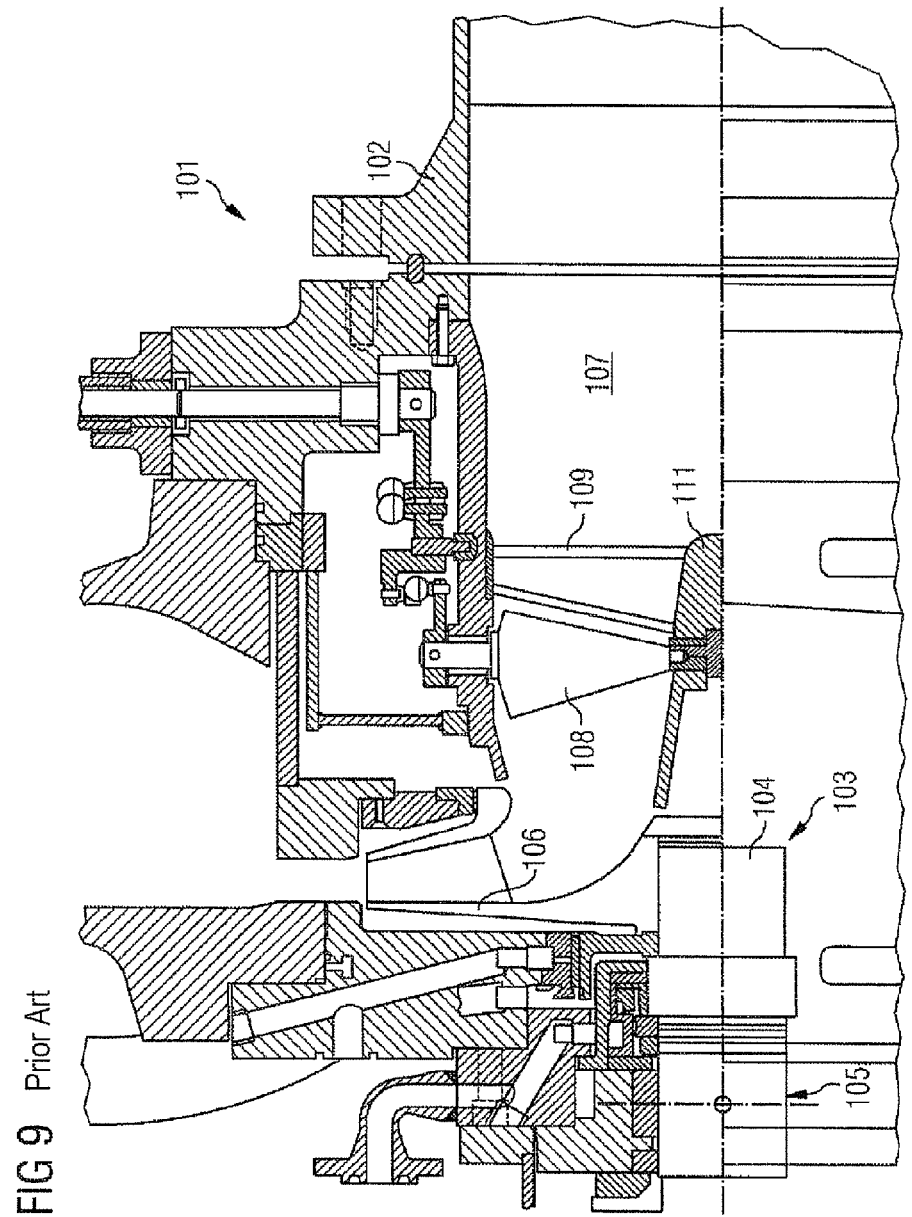
FIG. 9 shows a second example of a conventional turbo compressor.

The fourth exemplary embodiment of the coupling device which is shown in FIG. 7, is comparable with the second embodiment which is shown in FIG. 5, wherein instead of the labyrinth 16 provision is made for the honeycomb seal 23 with the honeycomb 24.

The invention claimed is:

1. A nose dome for a turbomachine rotor, comprising:
a coupling device having a projection with a cylindrical outer wall,
wherein the turbomachine includes an impeller which is arranged in an overhung manner in relation to a bearing point of the turbomachine rotor,
wherein in order to guide an axial inflow and/or an axial outflow of the impeller the nose dome is axially connected to the impeller,
wherein the impeller and the nose dome are radially mechanically coupled using the coupling device so that a vibrational behavior of the turbomachine rotor is effected,
wherein the impeller includes a shaft bore, which is accessible from the outside, the shaft bore has a cylindrical inner wall,
wherein the projection is inserted into the shaft bore forming a cylindrical annular gap between the cylindrical outer wall of the projection and the cylindrical inner wall of the shaft bore, and
wherein a pressurizing device is used so that the annular gap is pressurized with a pressurizing gas for damping a vibration of the turbomachine rotor,
wherein the pressurizing device includes a passage system which is formed in the nose dome,
wherein the passage system feeds the pressurizing gas into the annular gap, and
wherein the pressurizing gas flows into the annular gap through the cylindrical outer wall of the projection.

2. The nose dome as claimed in claim 1,
wherein the coupling device includes a labyrinth seal with a plurality of labyrinth points which are attached on the cylindrical outer wall of the projection and/or on the cylindrical inner wall of the shaft bore.

3. The nose dome as claimed in claim 2,
wherein the coupling device has a plurality of the labyrinth seals, and
wherein between the plurality of labyrinth seals the pressurizing gas is fed into the annular gap in order to pressurize the plurality of labyrinth seals.

4. The nose dome as claimed in claim 1, wherein the coupling device includes a honeycomb seal with a plurality of honeycombs which are attached on the cylindrical outer wall of the projection and/or on the cylindrical inner wall of the shaft bore.

5. The nose dome as claimed in claim 4,
wherein the coupling device has a plurality of honeycomb seals, and
wherein between the plurality of honeycomb seals the pressurizing gas is fed into the annular gap in order to pressurize the plurality of honeycomb seals.

6. A turbomachine, comprising:
a turbomachine rotor, comprising:
an impeller which is arranged in an overhung manner in relation to a bearing point of the turbomachine rotor, and
a nose dome,
wherein the impeller and the nose dome are radially coupled using a coupling device so that the vibrational behavior of the turbomachine rotor is influenced,
wherein the impeller has a shaft bore, which is accessible from the outside, with a cylindrical inner wall,
wherein the coupling device has a projection with a cylindrical outer wall, which can be inserted into the shaft bore, forming a cylindrical annular gap between the cylindrical outer wall of the projection and the cylindrical inner wall of the shaft bore, and
wherein a pressurizing device is used so that the annular gap is pressurized with a pressurizing gas for damping a vibration of the turbomachine rotor.

7. The turbomachine as claimed in claim 6, wherein the nose dome is fastened in a stationary manner relative to the impeller.

8. The turbomachine as claimed in claim 7, wherein the coupling device includes a honeycomb seal with a plurality of honeycombs which are attached on the cylindrical outer wall of the projection and/or on the cylindrical inner wall of the shaft bore.

9. The turbomachine as claimed in claim 8,
wherein the coupling device has a plurality of honeycomb seals, and
wherein between the plurality of honeycomb seals the pressurizing gas is fed into the annular gap in order to pressurize the plurality of honeycomb seals.

10. The turbomachine as claimed in claim 6, wherein the turbomachine is a centrifugal compressor.

11. The turbomachine as claimed in claim 10, wherein the centrifugal compressor includes an inlet passage for the impeller and a strut by which the nose dome is suspended in the inlet passage.

12. The turbomachine as claimed in claim 11, wherein the strut is aerodynamically formed.

13. The turbomachine as claimed in claim 12, wherein the strut is formed as a guide vane.

14. The turbomachine as claimed in claim 11, wherein the pressurizing device is supplied with the pressurizing gas through the strut.

15. The turbomachine as claimed in claim 11, wherein the turbomachine includes a variable guide vane which is arranged between the strut and the impeller.

16. The turbomachine as claimed in claim 6, wherein the pressurizing gas is a process gas of the turbomachine.

17. The turbomachine as claimed in claim 6,
wherein the pressurizing device includes a passage system which is formed in the nose dome,
wherein the passage system feeds the pressurizing gas into the annular gap, and
wherein the pressurizing gas flows into the annular gap through the cylindrical outer wall of the projection.

18. The turbomachine as claimed in claim 17,
wherein the coupling device includes a labyrinth seal with a plurality of labyrinth points which are attached on the cylindrical outer wall of the projection and/or on the cylindrical inner wall of the shaft bore.

19. The turbomachine dome as claimed in claim 18,
wherein the coupling device has a plurality of the labyrinth seals, and wherein between the plurality of labyrinth seals the pressurizing gas is fed into the annular gap in order to pressurize the plurality of labyrinth seals.

<p style="text-align:center">* * * * *</p>